Figure 1:
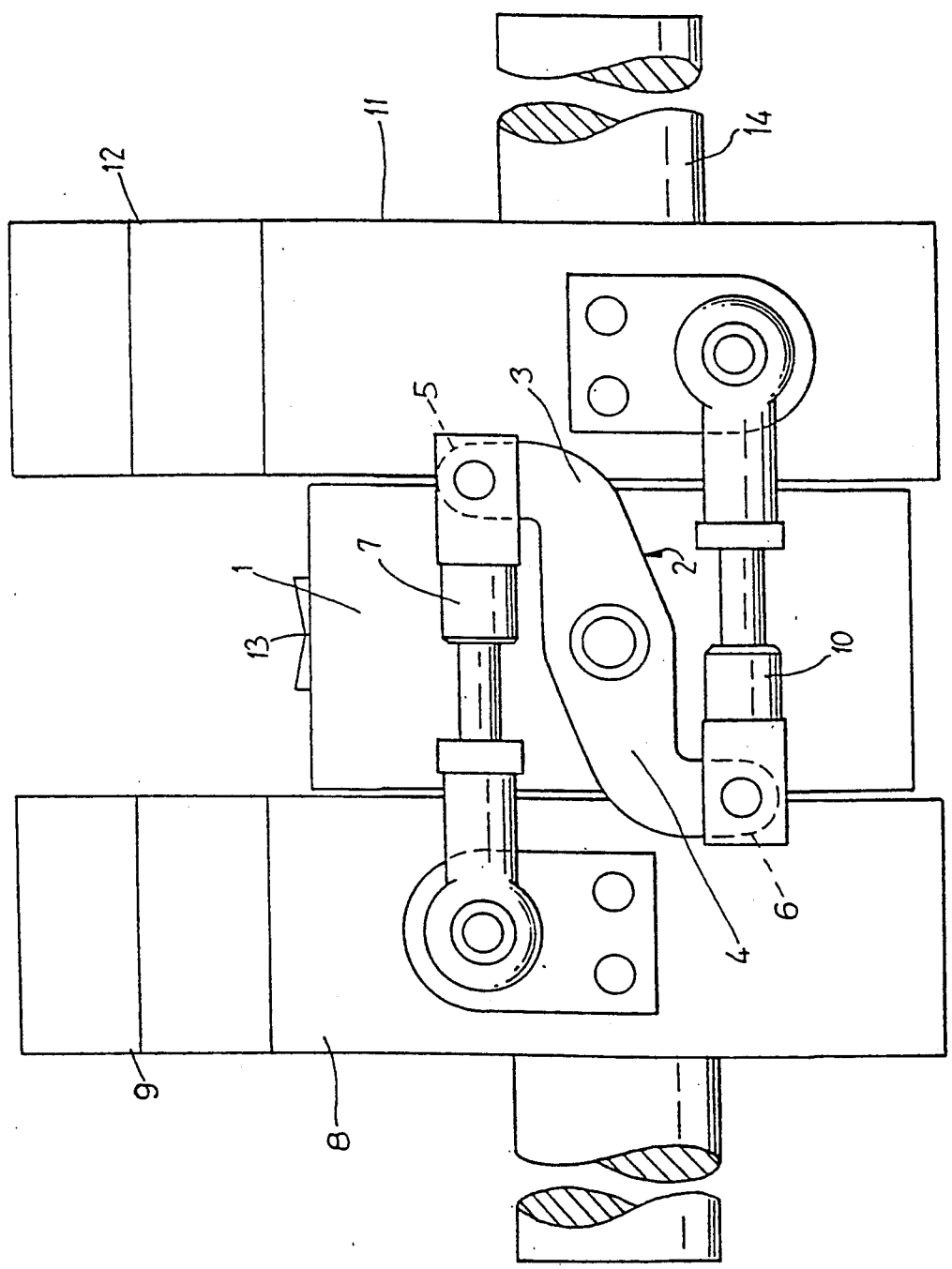

United States Patent [19]

Buxton

[11] Patent Number: 5,104,102

[45] Date of Patent: Apr. 14, 1992

[54] INTERCONNECTED MOVABLE MEMBERS

[75] Inventor: James S. Buxton, Coal Aston, England

[73] Assignee: Fusion Group PLC, Chesterfield, England

[21] Appl. No.: 714,577

[22] Filed: Jun. 13, 1991

Related U.S. Application Data

[63] Continuation of Ser. No. 453,776, Dec. 20, 1989, abandoned.

[30] Foreign Application Priority Data

Dec. 24, 1988 [GB] United Kingdom .................. 8830263

[51] Int. Cl.$^5$ .............................................. B25B 1/20
[52] U.S. Cl. ........................................... 269/43; 29/238
[58] Field of Search ............................. 269/43, 45, 287; 29/237, 238, 239, 282; 254/29 R

[56] References Cited

U.S. PATENT DOCUMENTS

| | | | |
|---|---|---|---|
| 431,054 | 7/1890 | Henderson | 269/43 |
| 3,653,115 | 4/1972 | Perkins | 269/43 |
| 4,054,9*84 | 10/1977 | Ball et al. | 269/43 |
| 4,420,921 | 12/1983 | Hardin | 269/43 |
| 4,769,889 | 9/1988 | Landman et al. | 29/237 |
| 4,856,168 | 8/1989 | Bazinet et al. | 269/43 |

*Primary Examiner*—J. J. Hartman
*Attorney, Agent, or Firm*—Trexler, Bushnell, Giangiorgi & Blackstone, Ltd.

[57] ABSTRACT

Apparatus to effect simultaneous and aligned movement of members toward and away from each other including first, second and third collar members, and a lever arm pivotally secured at its midpoint to the first collar member. The second and third collar members are attached to opposite ends of the lever arm, and the lever arm extends equal degrees to opposite sides of its pivotal connection to the first collar member. The first collar member is held in a fixed position, and the lever arm is rotated such that the second and third collars members, each grasping respective workpieces, are moved simultaneously toward or away from each other an identical distance.

6 Claims, 2 Drawing Sheets

INTERCONNECTED MOVABLE MEMBERS

CROSS-REFERENCE TO RELATED APPLICATION

This application is a continuation of my co-pending application Ser. No. 07/453,776, filed Dec. 20, 1989, now abandoned, entitled "INTERCONNECTED MOVABLE MEMBERS", which is owned by the same Assignee of the application.

This invention relates to equipment to control the movement of members towards each other and is particularly, but not necessarily exclusively, concerned with butt welding machines where two lengths of plastics pipe are required to be moved towards each other.

In the jointing of lengths of plastics pipes by butt fusion it is frequently so that one pipe length is already laid in a e.g. trench and connected to preceding pipe lengths, and hence is relatively immovable. Thus, equipment to bring about the butt welding of the next succeeding pipe length must be such that in the first stage, a trimmer plate positioned between the pipe ends is movable to bring it into contact with the end of the immovable pipe length and at the same time the end movable pipe length brought into contact with the opposite face of the trimmer plate. This frequently has the result that uneven trimming takes place consequent on one pipe end contacting the trimmer before or to a different degree to the other. Of perhaps greater significance is that in the second stage, and where a heater plate is positioned between the pipe ends, contact with the heater plate by one pipe end in advance of the other causes the heater plate to be pushed into contact with the second pipe end. There is therefore an almost inevitable result of one pipe receiving a greater heat input than the other, with the consequence that unequal sized welding sprues or beads are formed on the pipe ends.

A second problem attendant to existing equipment is that particularly when moving the movable pipe away from the heater plate, and moving the heater plate away from the immovable pipe, the said movements must be greater than theoretical considerations would predict, to ensure that both pipe ends are clear of the heater plate to enable its removal, and this is detrimental to the well-established need to bring the pipe ends into contact with each other as quickly as possible after they have been subjected to heat to a predetermined degree.

The object of the invention is to provide equipment to effect the controlled movement of members, and which, when applied to butt welding equipment avoids the disadvantges mentioned above.

According to the present invention, equipment to effect the simultaneous and aligned movement of members towards and away from each other comprises a first member, a second member located to one side of the first member, and a third member located to the opposite side of the first member, said first, second and third members being slidably mounted on a common slide bar means, a lever pivotally secured at its midpoint to said first member, said lever extending to equal degrees to opposite sides of its pivotal connection to said first member, a link pivotally connected to one end of said lever, and extending to and being pivotally secured to said second member, a second link pivotally connected to the opposite end of said lever and extending to and being pivotally secured to said third member.

Thus, the first member may be fixed in position and when the second and third members can be simultaneously closed on to and moved away from the first member. However, with the invention applied to butt welding equipment, the second and third members each take the form of, or are provided with, clamps, one of which is secured to the immovable pipe length and the other of which is secured to the movable pipe length, the first member takes the form of a support for ancillay equipment, and is slidably mounted on the slide bars. At the onset of operations, and with the clamps and pipe ends and the support spaced from one another, a trimmer plate can be introduced to rest on the support, for example in a V-groove formed in the upper surface of the support. With then the clamps and movable pipe driven towards the trimmer plate the central support and the trimmer plate is caused to move towards the immovable pipe end, and the links and cranked lever ensure that the trimmer plate is maintained exactly central between the pipe ends with the guarantee that it will contact the immovable pipe end simultaneously with the movable pipe end contacting the trimmer plate, to ensure that the pipe ends are identically trimmed. After trimming the clamp attaching to the movable pipe end is withdrawn, to withdraw the support and permit the removal of the trimmer plate, and allow the introduction of a heater plate that again rests on the central support. With then the clamp attaching to the movable pipe end moved towards the heater plate, the link and lever connection guarantees that support and hence the heater plate is maintained exactly central between the pipe ends as it moves towards the immovable pipe end with the guarantee that the pipe ends make simultaneous contact with opposite faces of the heater plate, and after the prescribed heating period are disengaged simultaneously from the heater plate with the surety that both pipe ends receive an identical degree of heat input and that identical welding sprues or beads are formed on the pipe ends.

The guarantee that the support is maintained exactly central between the movable members has the advantage that when applied to butt welding, the movement of one clamp and pipe end away from the heater plate and equal movement of the heater plate away from the other clamp and pipe end enables a shorter travel than has hitherto been felt necessary with the guarantee that the heater plate is clear of the pipe ends, thus allowing the pipe ends to be brought into abutting contact to create a butt welded joint in shorter time than has hitherto been possible.

A still further advantage of the invention is that the connection between the movable members and the guaranteed identity of movement has the effect of allowing a simpler sliding engagement means to be employed when the members are slidably mounted on slide bars. For example, slide bushes can be employed to locate the movable members (clamps) and central support on the slide bars rather than the more expensive roller bearing bushes that have hitherto been necessary, and larger diameter slide bars can be employed for the greater rigidity that that affords the whole structure.

Figure 2:
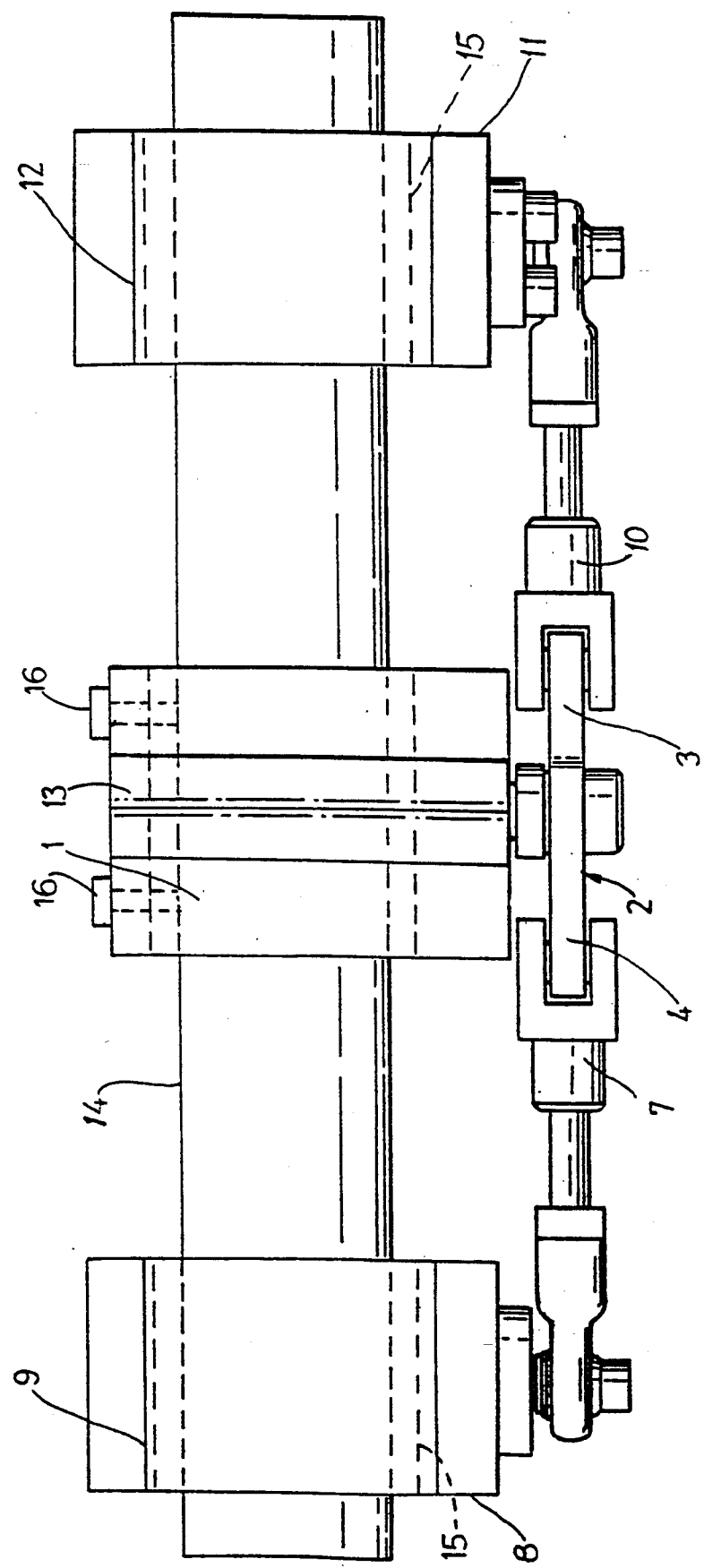

One embodiment of the invention is illustrated by way of example only in the accompanying, part-diagrammatic drawings, in which:

FIG. 1 is a side elevation of equipment according to the invention in a closed condition; and FIG. 2 is a plan view of the equipment of FIG. 1 in an open condition.

In the drawings, equipment particularly for the control of movement of plastics pipe lengths towards and away from each other has a first member in the form of a central support member 1 to which is pivotally secured a lever 2 at its centre, the arms 3, 4 of which extend to equal and opposite degrees to either side of the centre pivot point. The arm 3 has a cranked end 5, and the arm 4 has a cranked end 6, there being a link 7 pivotally secured to the cranked end 5 and extending to a pivotal connection to a second member 8 which is a support for a pipe clamp 9, and a second lever 10 pivotally secured to the cranked end 6 and extending to a pivotal connection to a third member 11 in the form of a support for a pipe clamp 12. Located on the first central support member 1 is a locating block 13 for locating ancillary equipment.

Each of the clamp support members 8 and 11 and central support member 1 are freely slidable on a slide bar 14 with interposed bearings 15.

Thus, with the equipment placed in close proximity to the end of a laid pipe length, clamp 9 on the adjacent clamp support member 8 is secured thereto with the pipe end projecting through the clamp to a required degree, and the next pipe to be laid brought into close proximity to the opposite clamp support member 11 with the end of the next pipe secured to its clamp 12 and projecting through that clamp to an equal degree. With the pipe to be laid pulled away from the laid pipe, the clamp 9 and its clamp support member 8 secured to the laid pipe are held stationary, and the central support member 1 and the opposite clamp 12 and clamp support member 13 slides along the slide bar 14 with a consequent pivoting of the cranked lever 2 until the central support member 1 and the clamp support member 11 have moved to the maximum degree permitted by the length of the cranked lever 2 and the pivotal links 7 and 10, as is shown in FIG. 2.

The central support member is provided with support block 13, preferably in the form of a V-groove, to allow the location of a trimmer plate (not shown) on the central support member 1. The clamp support member 11 is then driven towards the clamp support member 8 such as by applying a force to the pipe to be laid, and as a result of the interaction between the cranked lever 2 and the pivotal links 3 and 4, the central support member 1 closes on to the clamp support member 8 at the same rate and to the same degree as the clamp support member 11 closes on to the central support, with the guarantee that pipe ends located in the respective clamps 9 and 12 make simultaneous contact with opposite sides of the trimmer plates with equal force, and with the guarantee that the pipe ends are trimmed to an equal degree. The equipment is then put back to its FIG. 2 condition and the trimmer plate replaced by a heater plate and the closing sequence repeated, with again the guarantee that there is simultaneous contact between the pipe ends and opposite faces of the heater plate and to an equal degree, with the further guarantee that equal sized beads are formed on the pipe ends.

With the equipment re-opened and the heater plate removed, the closing sequence is again repeated to bring the pipe ends into direct contact for butt-welding to be effected.

To allow a different usage, locking screws 16 can be provided to lock the central support member 1 to the slide bar 14, and when a movement of one clamp support member results in an equal and opposite movement of the other clamp support member towards or away from the central support member.

I claim:

1. Equipment to effect the simultaneous and aligned movement of members towards and away from each other comprising a first member, a second member located to one side of the first member, and a third member located to the opposite side of the first member, said first, second and third members being slidably mounted on a common slide bar means, a lever pivotally secured at its midpoint to said first member, said lever extending to equal degrees to opposite sides of its pivotal connection to said first member, a link pivotally connected to one end of said lever, and extending to and being pivotally secured to said second member, a second link pivotally connected to the opposite end of said lever and extending to and being pivotally secured to said third member.

2. Equipment as in claim 1, wherein said first member is secured against movement on said slide bar and the second and third members slidably mounted thereon, and whereby a movement applied to one said second or third member causes an equal and opposite movement of said other member.

3. Equipment as in claim 1, wherein one of said second and third members is secured against movement on said slide bar and said first member and the other of said second and third members are slidably mounted on the said slide bar, and whereby a movement applied to the unsecured said second or third member causes a movement of said first member reduced to one-half of the degree of movement of said unsecured second or third member.

4. Equipment as in claim 1, wherein slide bushes are provided in said first, second, and third members on the said slide bar.

5. Equipment as in claim 1, wherein said first member includes with a means of locating ancillary equipment thereon.

6. Equipment as in claim 1, wherein pipe clamp members are located on said second and third members.

* * * * *